United States Patent
Wasnik et al.

(10) Patent No.: US 12,354,402 B2
(45) Date of Patent: Jul. 8, 2025

(54) LANDMARK DETECTION USING DEEP NEURAL NETWORK WITH MULTI-FREQUENCY SELF-ATTENTION

(71) Applicant: SONY GROUP CORPORATION, Tokyo (JP)

(72) Inventors: Pankaj Wasnik, Bangalore (IN); Aman Shenoy, Bangalore (IN); Naoyuki Onoe, Bangalore (IN); Janani Ramaswamy, Bangalore (IN)

(73) Assignee: SONY GROUP CORPORATION, Tokyo (JP)

(*) Notice: Subject to any disclaimer, the term of this patent is extended or adjusted under 35 U.S.C. 154(b) by 529 days.

(21) Appl. No.: 17/569,778

(22) Filed: Jan. 6, 2022

(65) Prior Publication Data

US 2022/0406091 A1 Dec. 22, 2022

Related U.S. Application Data

(60) Provisional application No. 63/211,127, filed on Jun. 16, 2021.

(51) Int. Cl.
*G06V 40/16* (2022.01)
*G06N 3/045* (2023.01)
(Continued)

(52) U.S. Cl.
CPC ........... *G06V 40/169* (2022.01); *G06N 3/045* (2023.01); *G06V 10/42* (2022.01); *G06V 10/44* (2022.01); *G06V 10/82* (2022.01); *G06V 40/171* (2022.01)

(58) Field of Classification Search
None
See application file for complete search history.

(56) References Cited

U.S. PATENT DOCUMENTS 10,452,978 B2 * 10/2019 Shazeer .................. G06N 3/08
2020/0302041 A1 * 9/2020 Mohammad ......... G06V 40/172
(Continued)

FOREIGN PATENT DOCUMENTS

| CN | 110619309 A | 12/2019 |
| CN | 111881743 A | 11/2020 |

(Continued)

OTHER PUBLICATIONS

Song et al. ("Higher Accuracy and Lower Complexity: Convolutional Neural Network for Multi-Organ Segmentation", SPIE, International Symposium on Artificial Intelligence and Robotics (ISAIR), 2020 (Year: 2020).*

(Continued)

*Primary Examiner* — Randolph I Chu
(74) *Attorney, Agent, or Firm* — CHIP LAW GROUP

(57) ABSTRACT

A system and method of landmark detection using deep neural network with multi-frequency self-attention is provided. The system includes an encoder network that receives an image of an object of interest as an input and generates multi-frequency feature maps as output. The system further includes an attention layer that receives the generated multi-frequency feature maps and refines the generated multi-frequency feature maps based on correlations or associations between the received multi-frequency feature maps. The system further includes a decoder network that receives the refined multi-frequency feature maps as a second input from the attention layer and generates a landmark detection result based on the second input. The landmark detection result includes a heatmap image of the object of interest and the heatmap image indicates locations of landmark points on the object of interest in the image.

20 Claims, 8 Drawing Sheets

(51) Int. Cl.
  *G06V 10/42* (2022.01)
  *G06V 10/44* (2022.01)
  *G06V 10/82* (2022.01)

(56) References Cited

U.S. PATENT DOCUMENTS

| | | | | |
|---|---|---|---|---|
| 2022/0138432 A1* | 5/2022 | Galitsky | ............... | G06N 3/045 |
| | | | | 704/9 |
| 2022/0207651 A1* | 6/2022 | Meng | ............... | G06T 5/60 |
| 2022/0269881 A1* | 8/2022 | Tao | ............... | G06N 3/049 |
| 2023/0107097 A1* | 4/2023 | Topoleanu | ............... | G06F 18/2431 |
| | | | | 715/863 |
| 2024/0031921 A1* | 1/2024 | Wasnik | ............... | H04W 24/04 |

FOREIGN PATENT DOCUMENTS

| | | | | | |
|---|---|---|---|---|---|
| JP | 2021009493 | A | | 1/2021 | |
| LU | 102496 | B1 | * | 8/2021 | ......... G06K 9/00221 |
| WO | WO-2021050772 | A1 | * | 3/2021 | ......... G06K 9/00335 |

OTHER PUBLICATIONS

Fan, et al., "Accurate Retinal Vessel Segmentation via Octave Convolution Neural Network", arXiv:1906.12193v8, [eess.IV], Sep. 23, 2020, 10 pages.

Das Neves Junior, "A Fast Fully Octave Convolutional Neural Network for Document Image Segmentation", arXiv:2004.01317v1 [cs. CV], Apr. 3, 2020. 6 pages.

Feng Liu, et al:"3D Face Modeling From Diverse Raw Scan Data", arxiv.org, ,Cornell University Library,201 Olin Library Cornell University Ithaca, NY 14853,Feb. 13, 2019 (Feb. 13, 2019), XP081461895.

Xiong, Pengfei, et al, "Combining Local and Global Features for 3D Face Tracking", 2017 IEEE International Conference on Computer Vision Workshopes (ICCVW), IEEE, Oct. 22, 2017 (Oct. 22, 2017), pp. 2529-2536, XP033303724.

Zhang, Junfeng et al;"Stacked Hourglass Network Joint with Salient Region Attention Refinement for Face Alignment", 2019 14th IEEE International Conference on Automatic Face & Gesture Recognition (FG 2019), IEEE May 14, 2019 (May 14, 2019), pp. 1-7, XP033576052.

Mohammad Akbari et al. Learned Multi-Resolution Variable-Rate Image Compression With Octave-Based Residual Blocks IEEE Transactions on Multimedia, IEEE, Mar. 24, 2021, vol. 23, pp. 3013-3021, https://doi.org/10.1109/TMM.2021.3068523.

* cited by examiner

LANDMARK DETECTION USING DEEP NEURAL NETWORK WITH MULTI-FREQUENCY SELF-ATTENTION

CROSS-REFERENCE TO RELATED APPLICATIONS/INCORPORATION BY REFERENCE

This application claims priority to U.S. Provisional Patent Application Ser. No. 63/211,127 filed on Jun. 16, 2021, the entire content of which is hereby incorporated herein by reference.

FIELD

Various embodiments of the disclosure relate to neural networks and object landmark detection. More specifically, various embodiments of the disclosure relate to a system and method for landmark detection using deep neural network with multi-frequency self-attention.

BACKGROUND

Advancements in machine learning and artificial intelligence have led to development of various kinds of neural networks (or models), which may be used in different applications, such as in landmarks detection (such as facial landmark detection). Typically, landmark detection corresponds to a task of detecting multiple key points or landmarks in images of an object (such as a human face). For a human face, such key points or landmarks may represent salient regions of the face, such as mouth, eyes, nose, jaws, or eyebrows. Facial landmark detection has multiple applications in, for example, facial recognition, face morphing, head pose estimation, face alignment, motion detection, 3D modelling, and the like. However, conventional techniques for landmark detection may not accurately detect the landmarks on the object in the image, especially if the image of the object is of poor quality (i.e. occluded or blurred). Also, the conventional techniques for landmark detection may not be robust enough to accurately detect the landmarks in images of objects, such as caricature faces or cartoonish faces that typically demonstrate high amounts of exaggerated facial features, unlike normal human faces and animated objects.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for landmark detection using deep neural network with multi-frequency self-attention is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
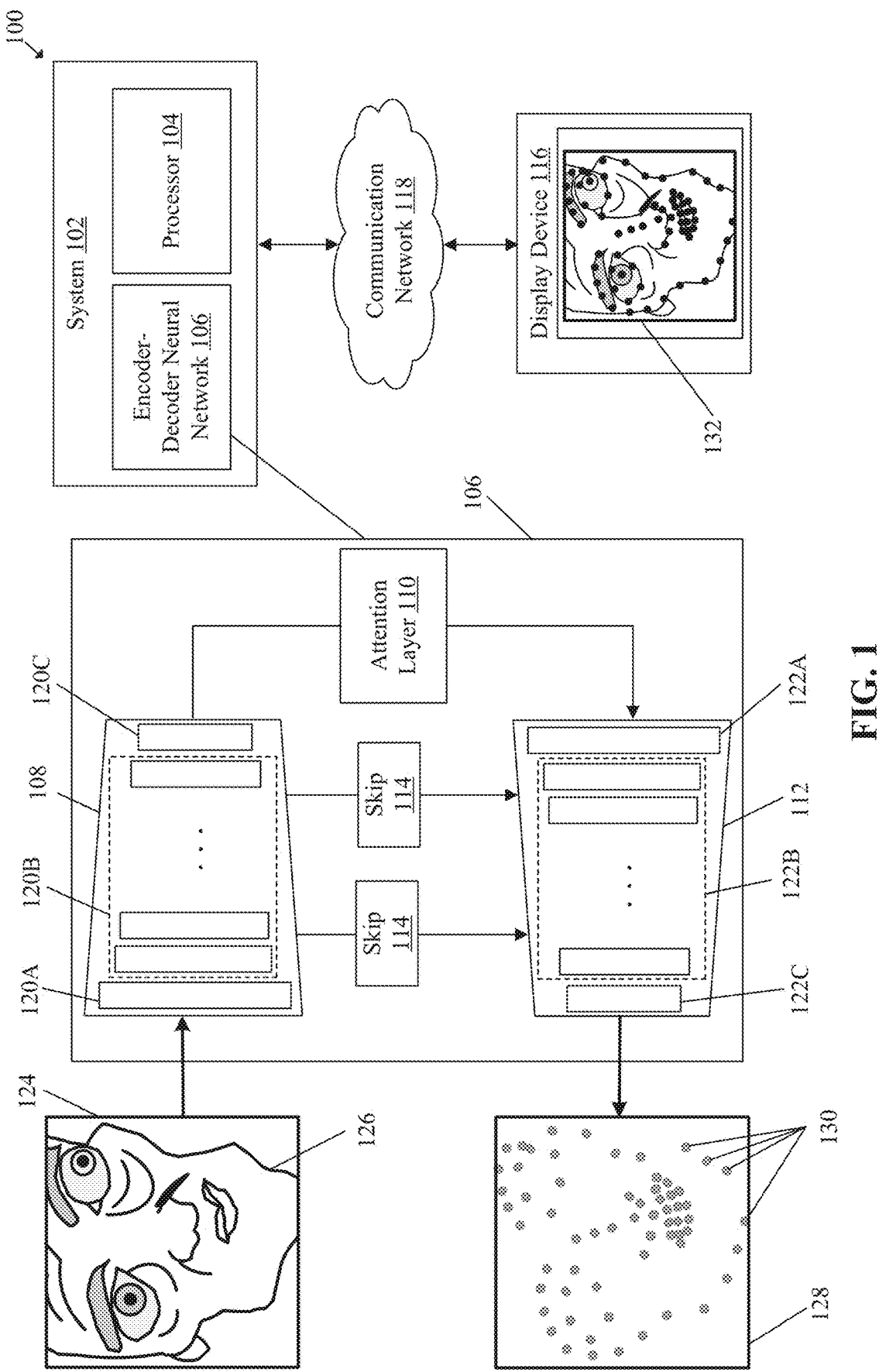
FIG. 1 is a diagram that illustrates a network environment for landmark detection using deep neural network with multi-frequency self-attention, in accordance with an embodiment of the disclosure.

The following described implementations may be found in a disclosed system and method for landmark detection using deep neural network with multi-frequency self-attention. The system includes an encoder network that may receive an input that includes an image of an object of interest (such as a human face or a caricature face) and may generate multi-frequency feature maps as an output of a final layer of the encoder network based on the received first input. The system further includes an attention layer that may be coupled to the final layer of the encoder network. The attention layer may receive the generated multi-frequency feature maps from the final layer of the encoder network and may refine the multi-frequency feature maps based on correlations or associations between the received multi-frequency feature maps. The system may further include a decoder network that may be coupled to the encoder network via the attention layer. The decoder network may receive the refined multi-frequency feature maps as an input from the attention layer and may generate a landmark detection result based on the input. The landmark detection result may include a heatmap image of the object of interest. The heatmap image may indicate locations of landmark points on the object of interest in the image.

Landmarks detection corresponds to a task of localizing predefined landmarks on the object of interest. For example, 68 landmarks can be predefined for the human face. The task of landmark detection plays an important role in many face-related applications, such as face frontalization, 3D face reconstruction, or face recognition. Facial landmarks detection may be required in various tasks, such as face super-resolution, emotion recognition, and other face reconstruction tasks involving the enhancement of facial quality or changing the style and appearance through make-up and other techniques.

Several traditional networks have been developed specifically for landmark detection from an image of the object of interest. However, most of these traditional networks may detect landmarks associated with only one type of object of interest. For example, if a network can detect facial landmarks on a real-human face image, the same network may face issues in detection of landmarks on a caricature face image that demonstrates high amounts of exaggerated facial features, unlike normal human faces. In some cases, if the image of the object of interest is occluded or blurred or has a different pose or illumination, then these traditional networks often struggle to provide desirable results.

The present disclosure provides a neural network architecture that addresses the challenges faced by the traditional networks by enabling a hierarchical multifrequency spatial learning for efficiently localizing landmarks in different variations of an object, such as a caricature face, a comic or cartoonish face, or a real-human faces. The present disclosure also provides a multi-frequency attention module that may capture correlations and complex interactions between one or more high-frequency feature maps and low-frequency feature maps, which handles variability in terms of sizes and shapes of various facial parts. Therefore, the present disclosure may provide a robust mechanism that may be able to detect landmarks for each type of the object of interest. The disclosed neural network may be capable of detecting the landmarks even if the image is occluded or blurred or has a different pose or illumination as compared to traditional networks that struggle to detect the landmarks in these situations.

FIG. 1 is a diagram that illustrates a network environment for landmark detection using deep neural network with multi-frequency self-attention, in accordance with an embodiment of the disclosure. With reference to FIG. 1, there is shown a diagram of a network environment 100. The network environment 100 includes a system 102. The system 102 includes a processor 104 and an encoder-decoder neural network 106. The encoder-decoder neural network 106 may include an encoder network 108, an attention layer 110, a decoder network 112, and one or more skip connections 114. With reference to FIG. 1, there is further shown a display device 116 and a communication network 118. The encoder network 108 may include a plurality of encoding layers. Such encoding layers may include an input layer 120A, a first set of convolution layers 120B that follow the input layer 120A, and a final layer 120C. Similarly, the decoder network 112 may include a plurality of decoding layers. Such decoding layers may include an input layer 122A, a second set of convolution layers 122B that follow the input layer 122A, and a final layer 122C. With reference to FIG. 1, there is also shown an image 124 of an object of interest 126, a heatmap image 128 that indicates location of landmark points 130, and a final image 132. The final image 132 may be displayed on the display device 116.

The processor 104 may include suitable logic, circuitry, and interfaces that may be configured to execute program instructions associated with different operations to be executed by the system 102. For example, some of the operations may relate to an overlay of colored markings on the image 124 to indicate the locations of the landmark points 130 on the objected of interest 126 to generate the final image 132 and a control of the display device 116 to render an output that includes the generated final image 132. In some other embodiment, the operations may relate to a training of the encoder-decoder neural network 106. The processor 104 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor (such as an inference accelerator or an Artificial Intelligence (AI) accelerator), and/or a combination thereof.

The encoder-decoder neural network 106 may be a computational network or a system of artificial neurons arranged in a plurality of layers. The encoder-decoder neural network 106 may determine a location of landmark points 130 on the object of interest 126 in the image 124. For instance, the encoder-decoder neural network 106 may be trained on a task of landmark detection (i.e. to detect the location of landmark points 130) on the object of interest 126.

The encoder network 108 may be a computational network or a system of artificial neurons, arranged in the plurality of encoding layers 120. The plurality of encoding layers 120 of the encoder network 108 may include an input layer 120A, a first set of convolution layers 120B, and a final layer 120N. Each layer of the plurality of encoding layers 120 may include one or more nodes (or artificial neurons, represented by circles or nodes, for example). Outputs of all nodes in the input layer 120A may be coupled to at least one node of a convolution layer(s) of the first set of convolution layers 120B. Similarly, inputs of each convolution layer may be coupled to outputs of at least one node in other layers of the encoder network 108. Outputs of each convolution layer may be coupled to inputs of at least one node in other layers of the encoder network 108. Node(s) in the final layer 120N may receive inputs from at least one convolution layer to output a result. The number of layers and the number of nodes in each layer may be determined from hyper-parameters of the encoder network 108. Such hyper-parameters may be set before or after training the encoder network 108 on a training dataset.

Each node of the encoder network 108 may correspond to a mathematical function (e.g., a sigmoid function or a rectified linear unit) with a set of parameters, tunable during training of the encoder network 108. The set of parameters may include, for example, a weight parameter, a regularization parameter, and the like. Each node may use a mathematical function to compute an output based on one or more inputs from nodes in other layer(s) (e.g., previous layer(s)) of the encoder network 108. All or some of the nodes of the encoder network 108 may correspond to same or a different mathematical function.

The encoder network 108 may include electronic data, which may be implemented as, for example, a software component of an application executable on the system 102 (or on the display device 116). The encoder network 108 may rely on libraries, external scripts, or other logic/instructions for execution by a processing device. The encoder network 108 may include code and routines configured to enable a computing device, such as the processor 104 to perform one or more operations for generating multi-frequency feature maps. Additionally, or alternatively, the encoder network 108 may be implemented using hardware, including but not limited to, a processor, a microprocessor (e.g., to perform or control performance of one or more operations), a co-processor, a field-programmable gate array (FPGA), or an application-specific integrated circuit (ASIC). In some embodiments, the encoder network 108 may be implemented using a combination of hardware and software.

The attention layer 110 may include suitable logic, circuitry, and interfaces that may be configured to receive the generated multi-frequency feature maps from the final layer 120N of the encoder network 108 and refine the multi-frequency feature maps based on correlations or associations between the received multi-frequency feature maps. The attention layer 110 may be coupled to the final layer 120N of the encoder network 108. Details about the refinement are provided, for example, in FIG. 3C.

The decoder network 112 may be a computational network or a system of artificial neurons, arranged in a plurality of decoding layers 122. The plurality of decoding layers 122 of the decoder network 112 may include an input layer 122A, a second set of convolution layers 122B, and a final layer 122N. Each layer of the plurality of decoding layers 122 may include one or more nodes or artificial neurons (represented by circles, for example). Outputs of all nodes in the input layer 122A may be coupled to at least one the second set of convolution layers 122B. Similarly, inputs of each of the second set of convolution layers 122B may be coupled to outputs of at least one node in other layers of the decoder network 112. Outputs of each convolution layer of the second set of convolution layers 122B may be coupled to inputs of at least one node in other layers of the decoder network 112. Node(s) in the final layer 122N may receive inputs from at least one convolution layer to output a result. The number of layers and the number of nodes in each layer may be determined from hyper-parameters of the decoder network 112. Such hyper-parameters may be set before or after training the decoder network 112 on a training dataset.

Each node of the decoder network 112 may correspond to a mathematical function with a set of parameters, tunable during training of the decoder network 112. The set of parameters may include, for example, a weight parameter, a regularization parameter, and the like. Each node may use the mathematical function to compute an output based on one or more inputs from nodes in other layer(s) (e.g., previous layer(s)) of the decoder network 112. All or some of the nodes of the decoder network 112 may correspond to same or a different same mathematical function.

The decoder network 112 may include electronic data, which may be implemented as, for example, a software component of an application executable on the system 102 (or the display device 116). The decoder network 112 may rely on libraries, external scripts, or other logic/instructions for execution by a processing device. The decoder network 112 may include code and routines configured to enable a computing device, such as the processor 104 to perform one or more operations for generating the landmark detection result. Additionally, or alternatively, the decoder network 112 may be implemented using hardware including a processor, a microprocessor (e.g., to perform or control performance of one or more operations), a field-programmable gate array (FPGA), a co-processor, or an application-specific integrated circuit (ASIC). Alternatively, in some embodiments, the decoder network 112 may be implemented using a combination of hardware and software.

The display device 116 may include suitable logic, circuitry, and interfaces that may be configured to display the final image 132 that may indicate the detected landmarks on the object of interest 126. In an embodiment, the display device 116 may be configured to display the heatmap image 128. The display device 116 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 116 may refer to a display screen of a head mounted device (HMD), a smart-glass device, a see-through display, a projection-based display, an electro-chromic display, or a transparent display.

In another embodiment, the display device 116 may include suitable logic, circuitry, interfaces, and/or code that may to implement the encoder-decoder neural network 106 as part of a software program or a service (such as an Application Programming Interface (API)-based service) executable on the display device 116. The encoder-decoder neural network 106 may be implemented on the display device 116 after the training of the encoder-decoder neural network 106 is over on the system 102. Examples of the display device 116 may include, but are not limited to, a computing device, a mainframe machine, a server, a computer workstation, a smartphone, a cellular phone, a mobile phone, a gaming device, a wearable display, a consumer electronic (CE) device, and/or any other device with image processing capabilities.

The communication network 118 may include a communication medium through which the system 102 and the display device 116 may communicate with each other. The communication network 118 may include one of a wired connection or a wireless connection. Examples of the communication network 118 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 118 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the encoder network 108 may receive a first input that may include an image, such as the image 124 of the object of interest 126. Based on the first input, the encoder network 108 may be configured to generate multi-frequency feature maps as an output of the final layer 120N of the plurality of encoding layers 120 of the encoder network 108.

The multi-frequency feature maps may include a first frequency feature map and a second frequency feature map. The first frequency feature map may capture first spatial information associated with global shape-features of the object of interest 126 and the second frequency feature map may capture second spatial information associated with local shape features of the object of interest 126. In an embodiment, the local shape features may be finer and greater in number in comparison to the global shape-features on the object of interest 126. The first frequency feature map may be referred as a low frequency feature map and the second frequency feature map may be referred as a high frequency feature map. By way of example, and not limitation, if the object of interest 126 is a human face or a person's caricature, then the low frequency feature map may cover a shape and a size of the human face or the person's caricature whereas the high frequency feature maps cover a shape and a size of lips, eyes, nose etc. of the human face or the person's caricature.

The attention layer 110 may be coupled to the final layer 120N of the encoder network 108. The attention layer 110 may receive the generated multi-frequency feature maps from the final layer 120N of the encoder network 108. The attention layer 110 may be configured to refine the multi-frequency feature maps based on correlations or associations between the received multi-frequency feature maps. Details about the attention layer 110 and refinement of the multi-frequency feature maps are provided, for example, in FIG. 3C.

The decoder network 112 may be coupled to the encoder network 108 via the attention layer 110. The decoder network 112 may be configured to receive the refined multi-frequency feature maps, as a second input, from the attention layer 110. The decoder network 112 may be configured to generate the landmark detection result based on the second input. The landmark detection result may include the heatmap image 128 of the object of interest 126. The heatmap image 128 may indicate the location of the landmark points 130 on the object of interest 126 in the image 124. Details about the decoder network are provided, for example, in FIG. 3B.

In accordance with an embodiment, the encoder-decoder neural network 106 may include the one or more skip connections 114 between an intermediate encoding layer of the encoder network 108 and an intermediate decoding layer of the decoder network 112. The intermediate encoding layer of the encoder network 108 may be configured to generate a first set of intermediate multi-frequency feature maps based on inputs from a previous layer of the encoder network 108. Each of the one or more skip connections 114 may be configured to transfer spatial information included in the first set of intermediate multi-frequency feature maps to the intermediate decoding layer of the decoder network 112. Details about the one or more skip connections 114 are provided, for example, in FIG. 3A and FIG. 3B.

The processor 104 may be configured to extract the landmark detection result from the final layer 122N of the decoder network 112. Thereafter, the processor 104 may overlay colored markings on the image 124 to indicate the locations of the landmark points 130 on the object of interest 126 to generate the final image 132. After the final image 132 is generated, the processor 104 may control the display device 116 to render an output that includes the final image 132. Details about the colored markings are provided, for example, in FIGS. 4A and 4B.

Figure 2:
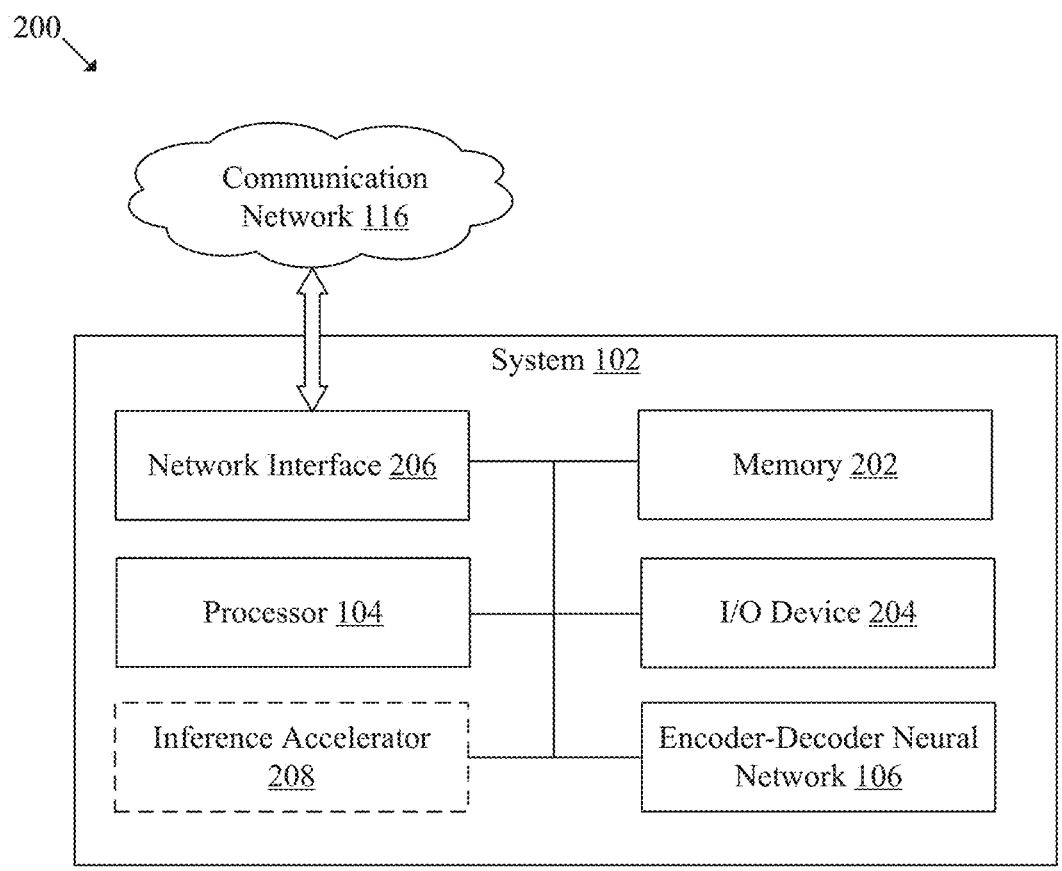
FIG. 2 is an exemplary block diagram of a system for landmark detection using deep neural network with multi-frequency self-attention, in accordance with an embodiment of the disclosure.

FIG. 2 is an exemplary block diagram of a system for landmark detection using deep neural network with multi-frequency self-attention, in accordance with an embodiment of the disclosure. FIG. 2 is explained in conjunction with elements from FIG. 1. With reference to FIG. 2, there is shown a block diagram 200 of the system 102 of FIG. 1. The system includes a processor (such as the processor 104), a memory 202, an input/output (I/O) device 204, a network interface 206, an inference accelerator 208, and the encoder-decoder neural network 106.

The memory 202 may include suitable logic, circuitry, and/or interfaces that may be configured to store the program instructions executable by the processor 104. Additionally, the memory 202 may store the image 124 and the heatmap image 128. In at least one embodiment, the memory 202 may also store the encoder-decoder neural network 106, the multi-frequency feature maps, and spatial information associated with the image 124. Examples of implementation of the memory 202 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 204 may include suitable logic, circuitry, and/or interfaces that may be configured to receive one or more user inputs and/or render information produced by the system 102. The I/O device 204 may include various input and output devices, which may be configured to communicate with different operational components of the system 102. Examples of the I/O device 204 may include, but are not limited to, a touch screen, a keyboard, a mouse, a joystick, a microphone, and a display device (such as the display device 116).

The network interface 206 may include suitable logic, circuitry, interfaces, and/or code that may be configured to establish communication between the system 102 and the display device 116, via the communication network 118. The network interface 206 may be configured to implement known technologies to support wired or wireless communication. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 206 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, 5G New Radio, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The inference accelerator 208 may include suitable logic, circuitry, interfaces, and/or code that may be configured to operate as a co-processor for the processor 104 to accelerate computations associated with the operations of the encoder-decoder neural network 106. For instance, the inference accelerator 208 may accelerate the computations on the system 102 such that the landmark detection result is generated in less time than what is typically incurred without the use of the inference accelerator 208. The inference accelerator 208 may implement various acceleration techniques, such as parallelization of some or all of the operations of the encoder network 108 and the decoder network 112. The inference accelerator 208 may be implemented as a software, a hardware, or a combination thereof. Example implementations of the inference accelerator 208 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof.

Figure 3A:
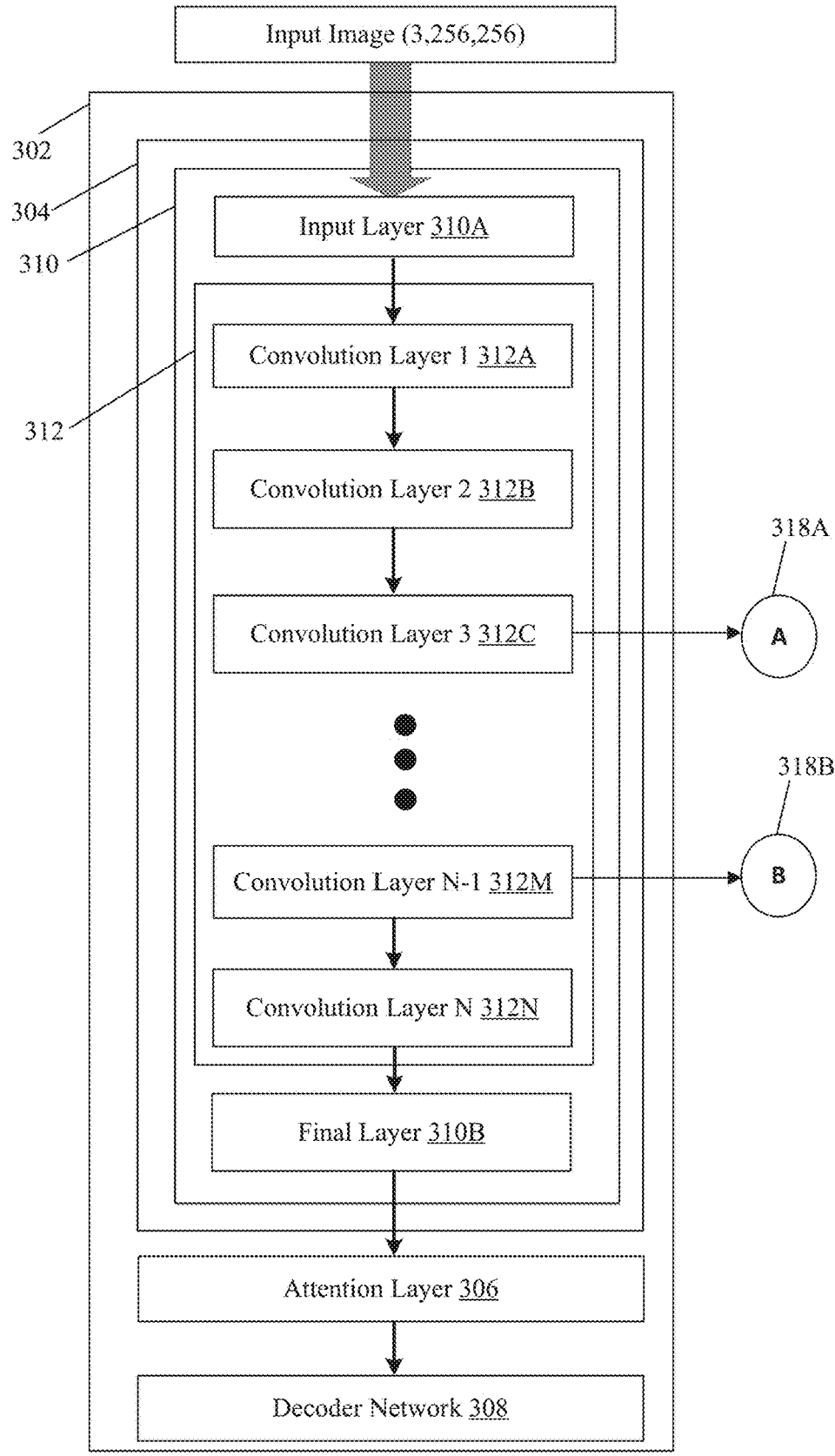
FIGS. 3A and 3B are diagrams that collectively illustrate an exemplary architecture of the encoder-decoder neural network of FIG. 1, in accordance with an embodiment of the disclosure.
Figure 3B:
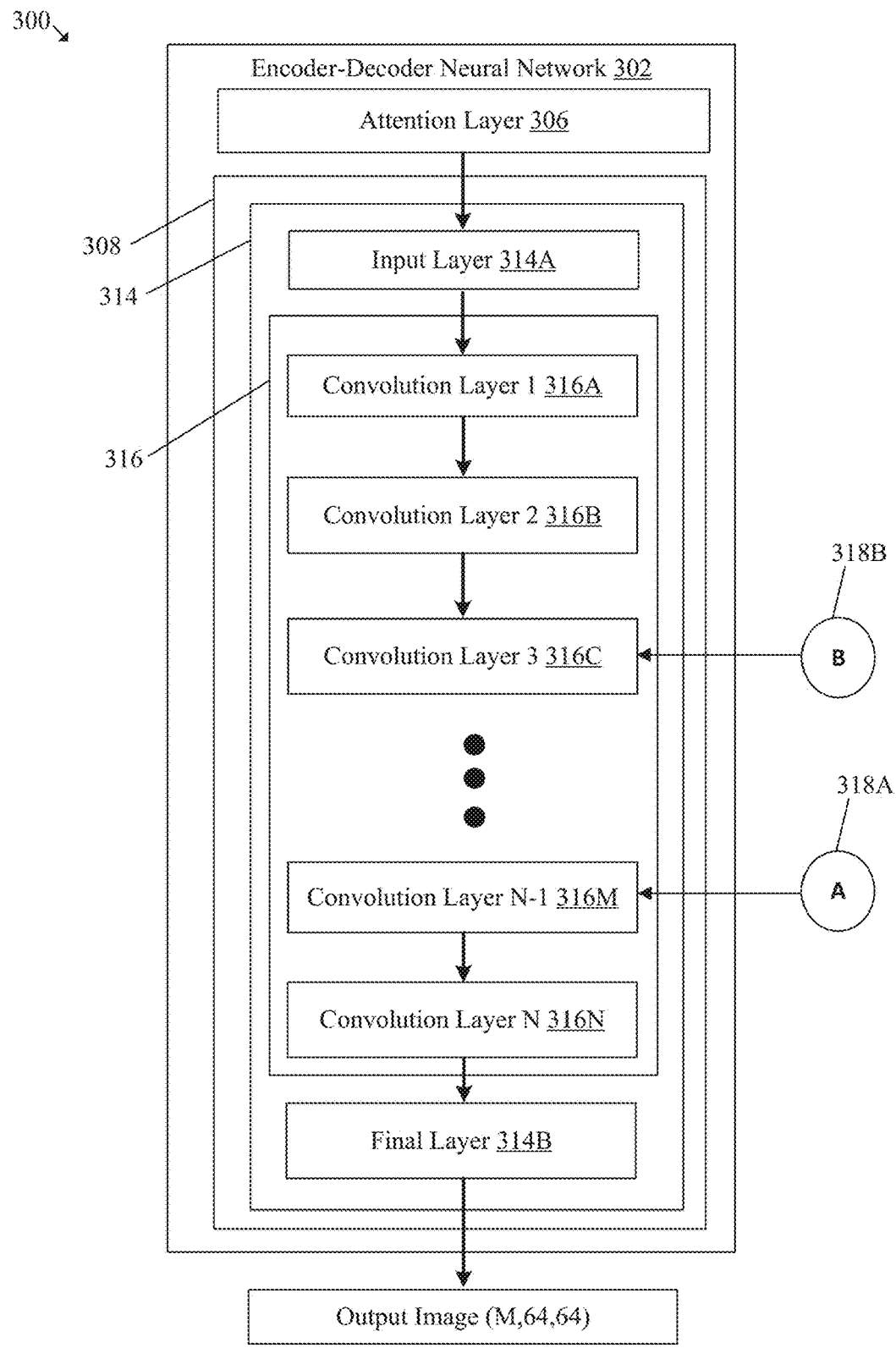

FIGS. 3A and 3B collectively illustrates an exemplary architecture of the encoder-decoder neural network of FIG. 1, in accordance with an embodiment of the disclosure. FIGS. 3A and 3B are explained in conjunction with elements from FIG. 1, and FIG. 2. With reference to FIGS. 3A and 3B, there is shown a diagram 300 of an encoder-decoder neural network 302, which may be an exemplary variant of the encoder-decoder neural network 106 of FIG. 1. The encoder-decoder neural network 302 may include an encoder network 304, an attention layer 306, and a decoder network 308. The encoder network 304 and the decoder network 308 may be coupled via the attention layer 306.

The encoder network 304 and the decoder network 308 may be a deep neural network (DNN). The encoder network 304 may include a plurality of encoding layers 310. The plurality of encoding layers 310 may include an input layer 310A, a first set of convolution layers 312, and a final layer 310B. The first set of convolution layers 312 may follow the input layer 310A and may include a first convolution layer 312A, a second convolution layer 312B, a third convolution layer 312C, up to an Nth convolution later 312N. For example, the first set of convolution layers 312 may include five convolution layers. The first convolution layer 312A may be coupled to the input layer 310A of the encoder network 304. Each of the remaining convolution layer of the first set of convolution layers 312 may be coupled to a previous convolution layer of the plurality of encoding layers 310. For example, the second convolution layer 312B may be coupled to the first convolution layer 312A, the third convolution layer 312C may be coupled to the second convolution layer 312B, and so on. Each convolution layer of the first set of convolution layers 312 may include two convolution operators. For example, the two convolution operators may correspond to octave convolution operations. Similar to the encoder network 304, the decoder network 308 may include a plurality of decoding layers 314. The plurality of decoding layers 314 may include an input layer 314A, a second set of convolution layers 316, and a final layer 310B. The second set of convolution layers 316 may follow the input layer 314A and may include a first convolution layer 316A, a second convolution layer 316B, a third convolution layer 316C, up to an Nth convolution later 316N. For example, the second set of convolution layers 316 may include five or less than five convolution layers. Specifically, the first convolution layer 316A of the second set of convolution layers 316 may be coupled to the input layer 314A of the decoder network 308. Each of the remaining convolution layers of the second set of convolution layers 316 may be coupled to a previous convolution layer of the plurality of decoding layers 314. For example, the second convolution layer 316B may be coupled to the first convolution layer 316A, the third convolution layer 316C may be coupled to the second convolution layer 316B, and so on. Each convolution layer of the second set of convolution layers 316 may include two convolution operators. For example, the two convolution operators may correspond to transposed octave convolution operations (also referred to as double transpose octave convolution operations).

In operation, the encoder network 304 of the encoder-decoder neural network 302 may be configured to receive a first input. Specifically, the input layer 310A of the plurality of encoding layers 310 of the encoder network 304 may be configured to receive a first input. The first input may include an input image (such as the image 124) of an object of interest (such as the object of interest 126). As shown in FIG. 3A, for example, the input image may be a 3-channel image (such as a red, green, and blue (RGB) image) of an input size 256×256 pixels. The object of interest 126 may correspond to an animate or an inanimate object. For example, the object of interest 126 may correspond to a face portion of a real-life person, a person's caricature, a fictious character, or a cartoon character.

In order to generate multi-frequency feature maps, the encoder network 304 may be configured to divide the input image (such as the image 124) included in the received first input into initial multi-frequency feature maps. The initial multi-frequency feature maps may include an initial first frequency feature map that may capture first spatial information associated with global shape-features of the object of interest 126 and an initial second frequency feature map that captures second spatial information associated with local shape features of the object of interest 126. The global shape-features may be associated with a shape of the object of interest 126. Whereas, the local shape-features may be associated with the shape of one or more parts and/or an expression of the object of interest 126. As an example, if the object of interest 126 is a human face, then then global features may be associated with the structure of the human face. Whereas the local features may be associated with the structure of facial parts (say eyes, lips, nose, etc.) and a facial expression of the human face. The initial first frequency feature map and the initial second frequency feature map may be referred as an initial low frequency feature map and an initial high frequency feature map, respectively. Each of the initial low frequency feature map and the initial high frequency feature map may be of a size that is different from the input size of the image 124. In an embodiment, the size of the initial high frequency feature map may be same as the input size of the image 124. Also, the size of the initial low frequency feature map may be one octave lower than the size of the high frequency feature map. For example, the initial high frequency feature map may be of size 256×256, and the initial low frequency feature map may of size 128×128.

The encoder network 304 may be further configured to pass the initial multi-frequency feature maps through the first set of convolution layers 312 to generate the multi-frequency feature maps as the output of the final layer 310B of the encoder network 304. As discussed above, each convolution layer of the first set of convolution layers 312 may include two convolution operators that may be applied on each of the initial multi-frequency feature maps. Each of the two convolution operators may correspond to an octave convolution operation (also referred to as a double octave convolution operation).

The octave convolution operation may factorize the multi-frequency feature maps into low and high frequency feature maps. Specifically, the octave convolution operation may capture spatial information associated with the image 124 at multiple frequencies. For example, if $I^H$ and $I^L$ represent the input high-frequency feature maps and low-frequency feature maps, respectively, then the output high and low frequency feature maps, $O^H$ and $O^L$ obtained from octave convolution may be obtained using equation (1) and equation (2), which is given as follows:

$$O^H = f^{H \to H}(I^H) + f^{L \to H}(I^L) \quad (1)$$

$$O^L = f^{L \to L}(I^L) + f^{H \to L}(I^H) \quad (2)$$

Where,
$f^{H \to H}$ and $f^{L \to L}$ refers to intra-frequency update operations, and
$f^{L \to H}$ and $f^{H \to L}$ denote inter-frequency communication.

The encoder network 304 may be further configured to pass the initial multi-frequency feature maps through the first set of convolution layers 312 to generate the multi-frequency feature maps as the output of the final layer 310B of the encoder network 304. Each convolution layer between the input layer 310A of the encoder network 304 and the final layer 310B of the encoder network 304 may generate a first set of intermediate multi-frequency feature maps. For example, the first convolution layer 316A (i.e. "Convolution Layer 1") may generate a set of first intermediate multi-frequency feature maps, the second convolution layer 316B (i.e. "Convolution Layer 2") may generate a set of second intermediate multi-frequency feature maps, and so on. A size of each intermediate feature map of the first set of intermediate multi-frequency feature maps may be less than the initial multi-frequency feature maps and more than the multi-frequency feature maps (obtained from the final layer 310B).

In an embodiment, a down sampling operation may be applied on each of the first set of intermediate multi-frequency feature maps before passing the corresponding intermediate multi-frequency feature maps to a next layer where octave convolution operations may be applied. For instance, the set of first intermediate multi-frequency feature maps generated by the first convolution layer 316A may be down-sampled before passing to the second convolution layer 316B.

By way of example, and not limitation, the size of the initial high frequency and low frequency feature maps may be 256×256 and 128×128, respectively. The first convolution layer 312A may generate a set of first intermediate multi-frequency feature maps that may include a high-frequency feature map and a low-frequency feature map of a size 128×128 and a size 64×64, respectively. Similarly, the second convolution layer 312B may generate a set of second intermediate multi-frequency feature maps that may include a high-frequency feature map and a low-frequency feature map of a size 64×64 and a size 32×32, respectively. Similarly, the Nth convolution layer 312N may generate intermediate multi-frequency feature maps that may include a high-frequency feature map and a low-frequency feature map of a size 16×16 and a size 8×8, respectively.

The final layer 310B of the encoder network 304 may generate the multi-frequency feature maps as the output. The multi-frequency feature maps may include a first frequency feature map that may capture first spatial information associated with global shape-features of the object of interest 126. As shown, for example, the first frequency feature map may be of a size 16×16. The multi-frequency feature maps may further include a second frequency feature map that may capture second spatial information associated with local shape features of the object of interest 126 and may be of a size 8×8 that is one octave less than that of the first frequency feature map. As discussed, the local shape features may be finer and greater in number in comparison to the global shape-features on the object of interest 126.

In an embodiment, each feature map generated by the first set of convolution layers 312 and the final layer 310B may have a number of channels. The number of channels in each of the first set of intermediate multi-frequency feature maps may be based on a first constant ($\alpha$) and a second constant (C). The first constant ($\alpha$) may denote a ratio of channels allocated to the low-frequency feature maps and the high frequency feature maps. The low-frequency feature maps may be defined as one octave lower than the high frequency feature maps, i.e. the spatial resolution of the low-frequency feature map may be half of the spatial resolution of the high-frequency feature map. The value of the first constant ($\alpha$) may lie between 0 and 1 (inclusive of both 0 and 1). In accordance with an embodiment, the value of the first constant ($\alpha$) may be set as 0.25 and the value of the second constant (C) may be fixed at 128. The number of channels in the first frequency feature map of the generated multi-frequency feature maps may be $(1-\alpha) \cdot 8C$ and the number of channels in the second frequency feature map of the generated multi-frequency feature maps may be $\alpha \cdot C$.

The attention layer 306 may be configured to receive the generated multi-frequency feature maps from the final layer 310B of the encoder network 304. The attention layer 306 may be coupled with the final layer 310B of the encoder network 304. The final layer 310B of the encoder network 304 may be referred as a bottleneck layer. The attention layer 306 may be configured to refine the multi-frequency feature maps based on correlations or associations between the received multi-frequency feature maps. Details about the attention layer 306 and the refinement of the multi-frequency feature maps are provided, for example, in FIG. 3C.

The decoder network 308 may be configured to receive the refined multi-frequency feature maps as a second input from the attention layer 306. Specifically, the input layer 314A of the decoder network 308 may be configured to receive the refined multi-frequency feature maps that may include a first refined multi-frequency feature map and a second refined feature map as an input to the decoder network 308. The decoder network 308 may be coupled to the encoder network 304 via the attention layer 306.

The decoder network 308 may be configured to generate a landmark detection result, based on the second input. To generate the landmark detection result, the decoder network 308 may be configured to pass the refined multi-frequency feature maps through the second set of convolution layers 316. The landmark detection result may be generated as an output of a final layer 314B of the decoder network 308. Similar to the encoder network 304, each convolution layer between the input layer 314A of the decoder network 308 and the final layer 314B of the decoder network 308 may generate a second set of intermediate multi-frequency feature maps. However, in contrary to the first set of intermediate multi-frequency feature maps, a size of each intermediate feature map of the second set of intermediate multi-frequency feature maps may be more than the refined multi-frequency feature maps.

In an embodiment, the decoder network 308 may be configured to upsample the refined multi-frequency feature maps. By way of example, if the size of the first refined multi-frequency feature map and the size of the second multi-frequency feature map received at the input layer 314A is 16×16 and 8×8, respectively, then the decoder network 308 may be configured to upsample the first refined multi-frequency feature map and the second multi-frequency feature map to 32×32 and 16×16, respectively. The decoder network 308 may pass the upsampled multi-frequency feature maps through a first convolution layer 316A of the second set of convolution layers 316 to generate first intermediate feature maps of size 32×32 and 16×16 respectively. As discussed, the first convolution layer 316A may include two convolution operators that may correspond to the transposed octave convolution operations. In some embodiments, the two convolution operators may correspond to bilinear interpolation operations.

With successive transposed octave convolution operations, it may be possible to retrieve the spatial information that may have been captured using the octave convolution operations at the encoder network 304. The decoder network 308 may be configured to apply the transposed octave convolution operations to retrieve the spatial information. The application of the transposed octave convolution operations at the first convolution layer 316A may result in upsampling of the generated first intermediate feature maps of size 32×32 and 16×16 to intermediate feature maps of size 64×64 and 32×32, respectively. Similarly, the second convolution layer 316B and successive convolution layers of the decoder network 308 may be configured to generate a second intermediate feature map, a third intermediate feature map, and so on. The final layer 314B of the decoder network 308 may be configured to generate the landmark detection result as output of the decoder network 308. In accordance with an embodiment, the decoder network 308 may be configured to apply a single transpose octave convolution on an intermediate output of the Nth convolution layer 316N to generate the landmark detection result as output of the final layer 314B of the decoder network 308.

The landmark detection result may include a heatmap image (or an output image) of the object of interest 126. The heatmap image may indicate locations of landmark points on the object of interest 126 in the image 124. For example, if the object of interest 126 is a human face, then a count of landmark points for the human face may be 68. In an embodiment, the final size of the heatmap image may be less than the input size of the image 124. This may be done to reduce computational overhead of processing the intermediate feature maps to generate the heatmap image of the input size. As shown in FIG. 3B, the size of the output image may be 64×64 and may have M number of channels. The number of channels (M) may correspond to the number of landmark points. For example, if the object of interest 126 is a human face, then the size of the output image may be 64×64 and the output image may have M=68 channels (same as the count of landmark points for the human face).

In an embodiment, the encoder-decoder neural network 302 may further include one or more skip connections. The one or more skip connections may include, but not limited to, a first skip connection 318A and a second skip connection 318B. The first skip connection 318A may be between a first intermediate encoding layer (such as a convolution Layer 3) of the encoder network 304 and a first intermediate decoding layer (such as a convolution layer N−1) of the decoder network 308. Similarly, the second skip connection 318B may be between a second intermediate encoding layer (such as a convolution Layer N−1) of the encoder network 304 and a second intermediate decoding layer (such as a convolution layer 3) of the decoder network 308.

The first intermediate encoding layer of the encoder network 304 may be configured to generate a first set of intermediate multi-frequency feature maps based on inputs from a previous layer of the encoder network 304 and the first skip connection 318A may be configured to transfer spatial information included in the first set of intermediate multi-frequency feature maps to the first intermediate decoding layer of the decoder network 308. In other words, the first skip connection 318A may be incorporated in the encoder-decoder neural network 302 to restore location information in the decoder network 308 and also to reduce spatial loss incurred during the encoding stages in the encoder network 304. Similarly, the second intermediate encoding layer of the encoder network 304 may be configured to generate a second set of intermediate multi-frequency feature maps based on inputs from a previous layer of the encoder network 304 and the second skip connection 318B may be configured to transfer spatial information included in the second set of intermediate multi-frequency feature maps to the second intermediate decoding layer of the decoder network 308. In an embodiment, the encoder-decoder neural network 106 may include more than two skip connections.

It should be noted that the attention layer 306 may be incorporated at the bottleneck layer (i.e. after the final layer 310B of the encoder network 304) as the final layer 310B contains most important and abstract information that may be encoded at the encoder network 304. Moreover, the spatial resolutions of the high and low-frequency feature maps may be less at the bottleneck layer. This may reduce the computational cost for operations of the attention layer 306 and may lead to faster execution of the encoder-decoder neural network 302.

The disclosed encoder-decoder neural network 302 may be robust enough for detecting the landmarks for the face portion of the real-life person, the person's caricature, the fictious character, or the cartoon character even though the person's caricature, the fictious character, or the cartoon character may include exaggerated facial features (e.g., complex jaw structures) in comparison to the face portion of the real-life person. Also, the disclosed system may be able to detect landmarks even in cases of challenging scenarios of pose variations, illumination changes, blur, and occlusion, and the like. This may be possible because the disclosed encoder-decoder neural network 302 may capture multi-frequency spatial information at every stage of encoding and decoding. This may enable the encoder-decoder neural network 302 to learn the global and local structure exploiting the multi-frequency multi-scale information received at every stage. Although the spatial dimensions reduce at successive encoding layers, high-level abstract information is learnt by the encoder-decoder neural network 302 as a part of the process. Moreover, to further enhance the quality of the feature maps, the attention layer 306 added at the bottleneck layer may capture the long-range dependencies. This attention layer 306 may further catalyzes the inter-frequency communication thus offering attention and ensuring a high-level feature refinement. Moreover, one or more skip connections may be incorporated into the encoder-decoder neural network 302 to restore location information and also reduce spatial loss incurred during the encoding stages.

As part of an experiment, one or more evaluation metrics are calculated for multiple datasets using the disclosed encoder-decoder neural network 302. The one or more evaluation metrics include a normalized mean error (NME) and a failure rate. For example, multiple datasets may include a caricature dataset, a 300 faces in the wild (300W) dataset, a Caltech Occluded Faces in the Wild (COFW) dataset, and a Wider Facial Landmarks in the Wild (WFLW) dataset. The NME error for the disclosed encoder-decoder neural network 302 is lowest among all the traditional methods for landmark detection known in the art.

Figure 3C:
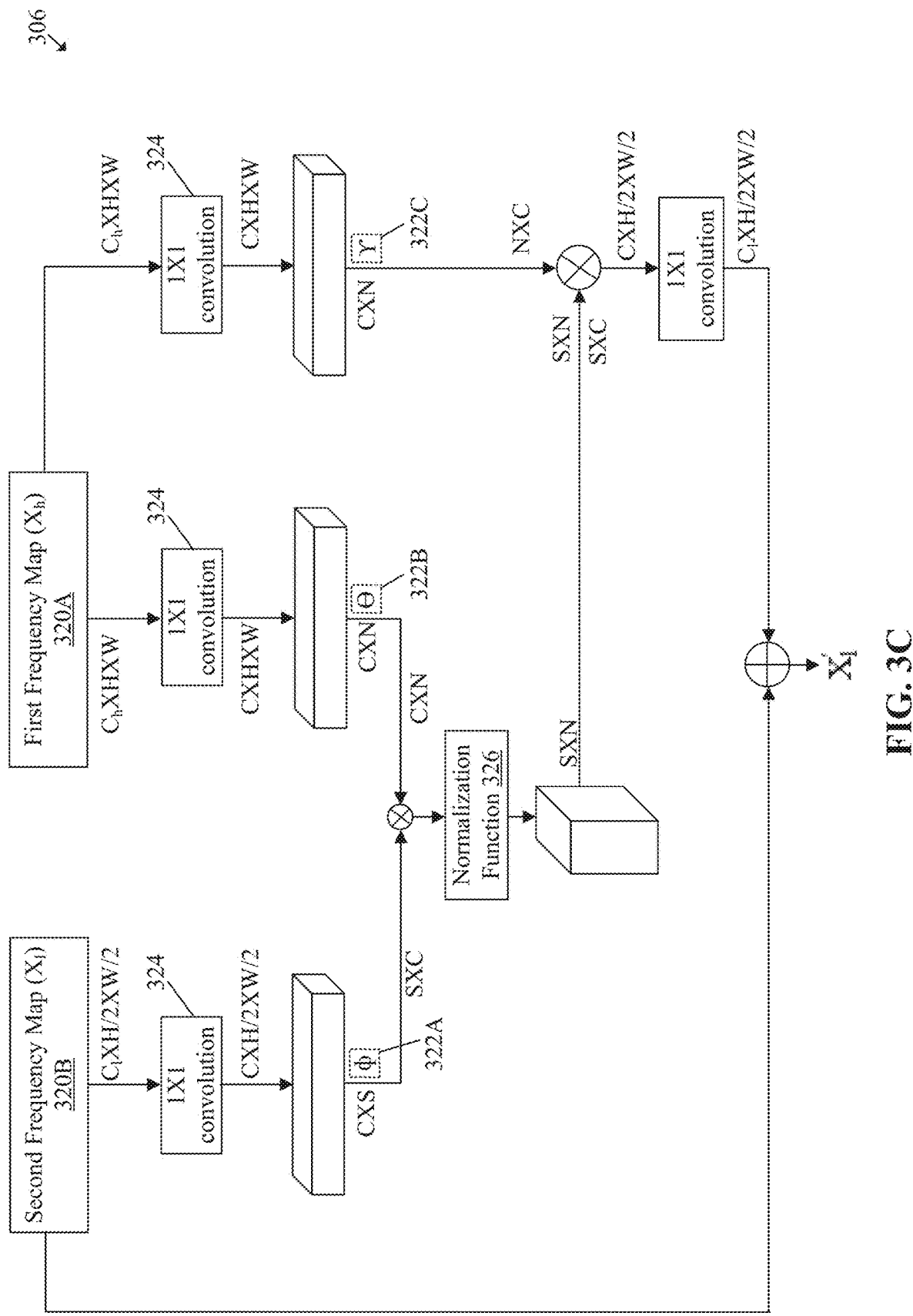
FIG. 3C is a diagram that depicts an exemplary architecture of the attention layer of the encoder-decoder neural network of FIG. 1, in accordance with an embodiment of the disclosure.

FIG. 3C is a diagram that illustrates an exemplary attention layer of the encoder-decoder neural network 302 of FIG. 3A and FIG. 3B, in accordance with an embodiment of the disclosure. FIG. 3C is explained in conjunction with elements from FIG. 1, FIG. 2, FIG. 3A, and FIG. 3B. With reference to FIG. 3C, there is shown the attention layer 306 that may be incorporated between the encoder network 304 and the decoder network 308 of the encoder-decoder neural network 302.

In an embodiment, the attention layer 306 may be coupled with the final layer 310B of the encoder network 304. The attention layer 306 may be configured to receive the generated multi-frequency feature maps from the final layer 310B of the encoder network 304. In an embodiment, the final layer 310B of the encoder network 304 may be referred as a bottleneck layer. In other words, the attention layer 306 may be implemented at the bottleneck layer. The attention layer 306 may be configured to refine the multi-frequency feature maps based on correlations or associations between the received multi-frequency feature maps.

As discussed above, the generated multi-frequency feature maps may include a first frequency feature map ($X_h$) 320A and a second frequency feature map ($X_l$) 320B. The first frequency feature map 320A may include $C_h$ channels and may be of height "H" and width "W". The second frequency feature map 320B may include $C_l$ channels and as the second frequency feature map 320B is one octave lower than the first frequency feature map 320A. Therefore, the second frequency feature map 320B may be of a height "H/2" and a width "W/2". To refine the multi-frequency feature maps, the attention layer 306 may be configured to obtain a set of embeddings that may include a first embedding ($\phi$) 322A, a second embedding ($\theta$) 322B, and a third embedding ($\gamma$) 322C from the received multi-frequency feature maps. An embedding may correspond to a translation of a high-dimensional vector into a low-dimensional space. Specifically, each of the set of embeddings may be obtained by application of 1×1 convolution operation 324 on the multi-frequency feature maps. By way of example, and not limitation, the first embedding 322A, the second embedding 322B, and the third embedding 322C are provided via equations (3), (4), and (5), as follows:

$$\phi = W_\phi(X_l) \quad (3)$$

$$\theta = W_\theta(X_h) \quad (4)$$

$$\gamma = W_\gamma(X_h) \quad (5)$$

where, $X_h$ represents the first frequency feature map 320A of the multi-frequency feature maps and $X_h \in R^{C_h \times H \times W}$, $X_l$ represents the second frequency feature map 320B of the multi-frequency feature maps and $$X_l \in R^{C_l \times \frac{H}{2} \times \frac{W}{2}},$$

H represents a height of the first frequency feature map 320A,

W represents a width of the first frequency feature map 320A, $C_h$ represents the number of channels in the first frequency feature map 320A, $C_l$ represents the number of channels in the second frequency feature map 320B, $$\phi \in R^{C \times \frac{H}{2} \times \frac{W}{2}},$$

$$\theta \in R^{C \times H \times W},$$

$$Y \in R^{C \times H \times W}, \text{ and}$$

$$C = 128 (\text{fixed value}).$$

The attention layer 306 may be further configured to flatten each of the set of embeddings to a particular size. For example, the first embedding may be flattened to a size of C×S. Each of the second embedding and the third embedding may be flattened to the size of C×N, wherein the S and N represents a count of spatial locations i.e., S=H/2×W/2 and N=H*W, respectively.

The attention layer 306 may be further configured to determine one or more co-relations between the first frequency feature map 320A and the second frequency feature map 320B. Specifically, the attention layer 306 may be configured to calculate a similarity matrix that may capture long-range dependencies between the low-frequency and high-frequency spatial information captured in the first frequency feature map 320A and the second frequency feature map 320B, respectively. In an embodiment, the similarity matrix may be calculated using a matrix multiplication, as provided in equation (6):

$$Y = \phi^T \times \theta \quad (6)$$

where,

Y represents the similarity matrix and $Y \in R^{S \times N}$.

The attention layer 306 may be further configured to normalize the similarity matrix to obtain a unified similarity matrix. Specifically, the calculated similarity matrix may be normalized based on a normalization function 326. In an embodiment, the normalization function 326 may be a SoftMax function. The unified similarity matrix may be obtained using equation (7), which is given as follows:

$$\tilde{Y} = f(Y) \quad (7)$$

where,

Y represents the similarity matrix and $Y \in R^{S \times N}$, f represents the normalization function, and $\tilde{Y}$ represents the unified similarity matrix.

In an embodiment, the output of the attention layer 306(Z) for each location in Y (as described in equation 7) may be provided by equation (8), which is given as follows:

$$Z = \tilde{Y} \times \gamma^T \quad (8)$$

where,

Z represents the attention layer 306 and $Z \in R^{S \times C}$, and $\gamma^T$ represents the transpose of the third embedding 322C.

The attention layer 306 may be further configured to restore the spatial locations to obtain H/2×W/2 from S and Z, respectively. The attention layer 306 may further pass S and Z through 1×1 convolution to obtain back $C_l$ number of channels from C. The attention layer 306 may be further configured to enable a residual connection to obtain a first refined multi-frequency feature map 328. In an embodiment, the first refined multi-frequency feature map 328 may be provided by equation (9), which is given as follows:

$$X'_l = W_Z(Z) + X_l \quad (9)$$

where $X'_l$ is the first refined multi-frequency feature map 328 and $X'_l \in R^{C_l \times H/2 \times W/2}$. The first refined multi-frequency feature map 328 (provided by equation (9)) may have captured the complex associations between the high-frequency and the low-frequency spatial information.

In an embodiment, the second refined feature map may be $X_h$. The attention layer 306 may be configured to provide the first refined feature map (given by equation (9)) and the second refined feature map as an input to the decoder network 308. As discussed, the decoder network 308 may receive the refined multi-frequency feature maps and may generate the heatmap image 128 based on the refined multi-frequency feature maps as input.

Figure 4A:
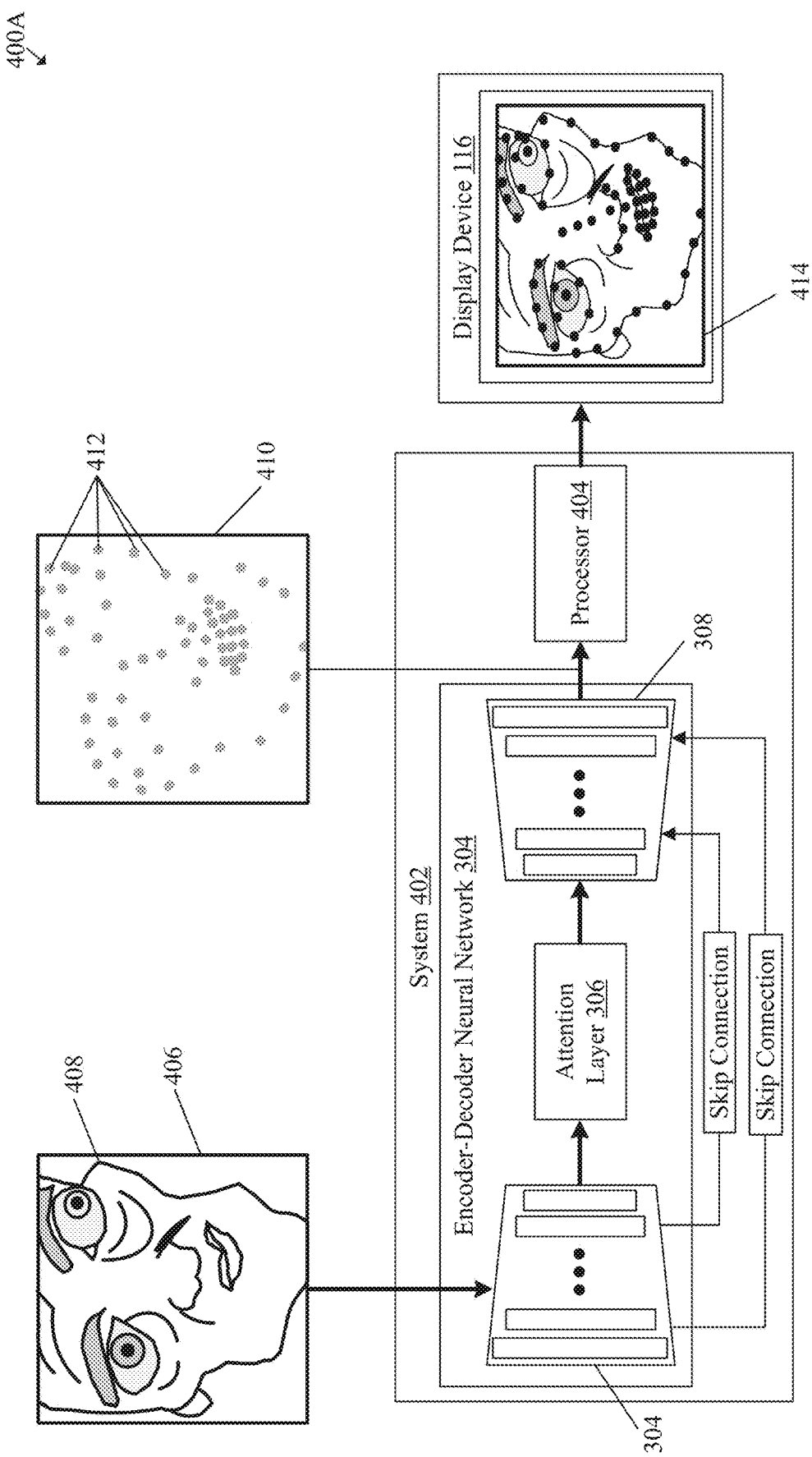
FIG. 4A is a diagram that illustrates an exemplary scenario for landmark detection using deep neural network with multi-frequency self-attention, in accordance with an embodiment of the disclosure.

FIG. 4A is a diagram that illustrates an exemplary scenario for landmark detection using deep neural network with multi-frequency self-attention, in accordance with an embodiment of the disclosure. FIG. 4A is explained in conjunction with elements from FIG. 1, FIG. 2, FIG. 3A, FIG. 3B, and FIG. 3C. With reference to FIG. 4A, there is shown a scenario 400A. In the scenario 400A, there is shown a system 402 that include a processor 404, the encoder-decoder neural network 302 of FIG. 3A and FIG. 3B, and the display device 116 of FIG. 1. There is further shown an image 406 of a caricature face 408.

The encoder-decoder neural network 302 may include the encoder network 304, the attention layer 306, and the decoder network 308. The encoder network 304 may receive a first input that may include the image 406 of an object of interest (i.e. the caricature face 408). The encoder network 304 may be further configured to generate multi-frequency feature maps as output of the final layer 310B of the encoder network 304. The multi-frequency feature maps may be generated based on the received first input.

The encoder network 304 may be further configured to transmit the multi-frequency feature maps to the attention layer 306 that may be coupled to the final layer 310B of the encoder network 304. The attention layer 306 may receive the generated multi-frequency feature maps from the final layer 310B of the encoder network 304 and may refine the multi-frequency feature maps based on correlations or associations between the received multi-frequency feature maps. The attention layer 306 may further transmit the refined multi-frequency feature maps to the decoder network 308 that may be coupled to the encoder network 304 via the attention layer 306.

The decoder network 308 may receive the refined multi-frequency feature maps as a second input from the attention layer 306. The decoder network 308 may be further configured to generate a landmark detection result. In an embodiment, the processor 404 may be configured to extract the landmark detection result from the final layer 314B of the decoder network 308. The landmark detection result may include a heatmap image 410 of the caricature face 408. The heatmap image 410 may indicate locations of landmark points 412 on the caricature face 408 in the image 406.

In an embodiment, the processor 404 may be configured to overlay colored markings on the image 406 to indicate the locations of the landmark points 412 on the caricature face 408 based on the heatmap image 410. Based on the overlaid color markings on the image 406, a final image 414 may be generated. For example, each location of the landmark points 412 may be depicted using a first color (such as white) or a combination of at least 2 colors (such as white and red). In an embodiment, the location of the landmark points 412 associated with the global shape-features may be depicted using the first color and the location of the landmark points 412 associated with the local shape-features may be depicted using the second color. The processor 404 may be further configured to control the display device 116 to render an output that may include the final image 414 with the colored markings overlaid on the image 406.

Figure 4B:
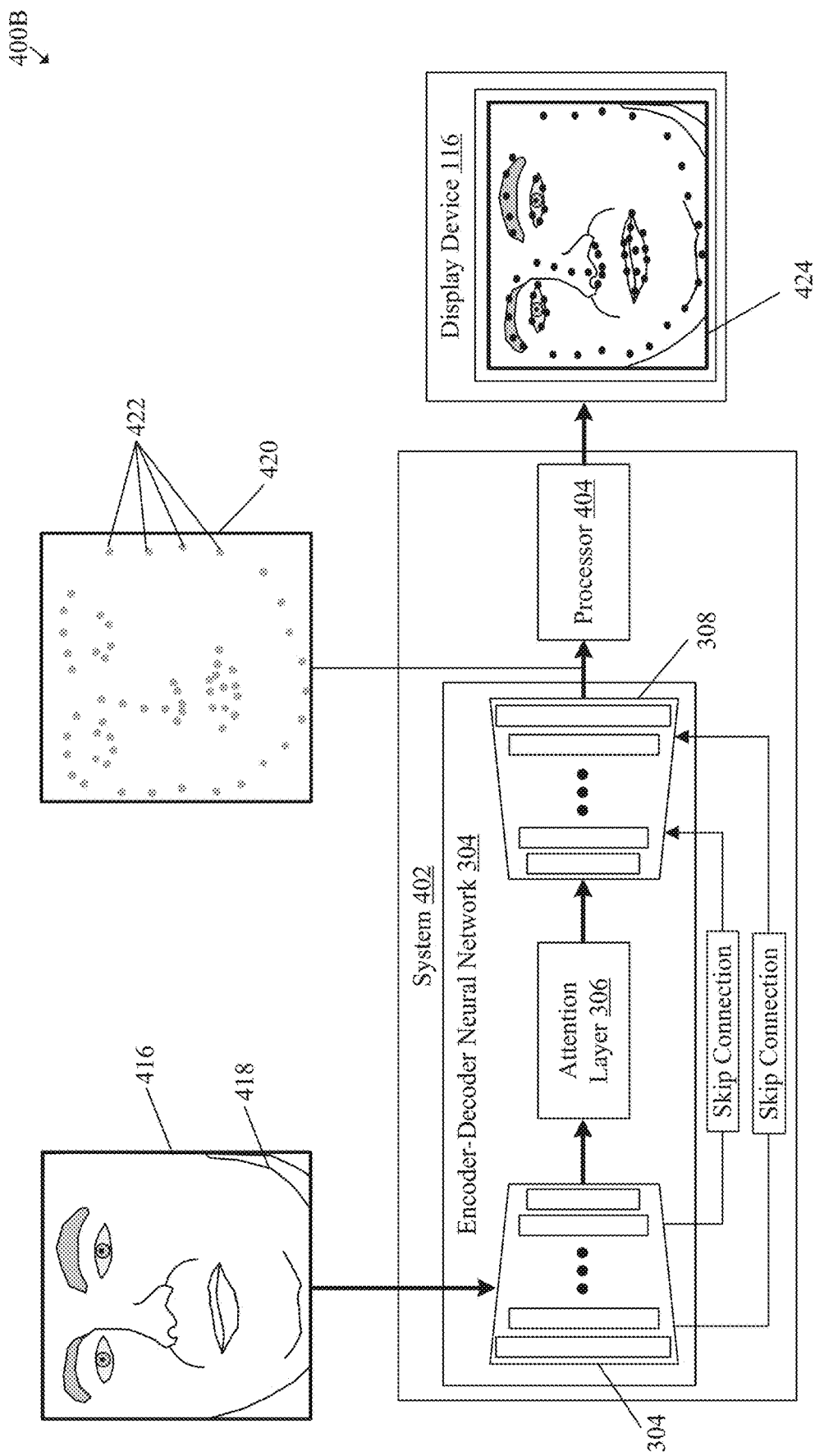
FIG. 4B is a diagram that illustrates an exemplary scenario for landmark detection using deep neural network with multi-frequency self-attention, in accordance with an embodiment of the disclosure.

FIG. 4B is a diagram that illustrates an exemplary scenario for landmark detection using deep neural network with multi-frequency self-attention, in accordance with an embodiment of the disclosure. FIG. 4B is explained in conjunction with elements from FIG. 1, FIG. 2, FIG. 3A, FIG. 3B, FIG. 3C, and FIG. 4A. With reference to FIG. 4B, there is shown a scenario 400B. In the scenario 400B, there is shown a diagram of the system 402 that includes the processor 404, the encoder-decoder neural network 302 of FIG. 3A and FIG. 3B, and the display device 116 of FIG. 1. There is further shown an image 416 of a human face 418.

The encoder-decoder neural network 302 may include the encoder network 304, the attention layer 306, and the decoder network 308. The encoder network 304 may receive a first input that may include the image 416 of an object of interest (i.e. the human face 418). The encoder network 304 may be further configured to generate multi-frequency feature maps as an output of the final layer 310B of the encoder network 304. The multi-frequency feature maps may be generated based on the received first input.

The encoder network 304 may be further configured to transmit the multi-frequency feature maps to the attention layer 306 that may be coupled to the final layer 310B of the encoder network 304. The attention layer 306 may receive the generated multi-frequency feature maps from the final layer of the encoder network 304 and may refine the multi-frequency feature maps based on correlations or associations between the received multi-frequency feature maps. The attention layer 306 may further transmit the refined multi-frequency feature maps to the decoder network 308 that may be coupled to the encoder network 304 via the attention layer 306.

The decoder network 308 may receive the refined multi-frequency feature maps as a second input from the attention layer 306 and may generate a landmark detection result that includes a heatmap image 420 of the human face 418. The heatmap image 420 may indicate locations of landmark points 422 on the human face 418 in the image 416.

In an embodiment, the processor 404 may be configured to extract the landmark detection result from the final layer 310B of the decoder network 308. The processor 404 may be further configured to overlay colored markings on the image 416 to indicate the locations of the landmark points 422 on the human face 418. Based on the overlaid color markings on the image 416, a final image 424 may be generated. For example, each location of the landmark points 422 may be depicted using a first color (such as white) or a combination of at least 2 colors (such as white and red). In an embodiment, the locations of the landmark points 422 associated with the global shape-features may be depicted using the first color and the locations of the landmark points 422 associated with the local shape-features may be depicted using the second color. The processor 404 may be further configured to control the display device 116 to render an output that may include the final image 424 with the colored markings overlaid on the image 416.

Figure 5:
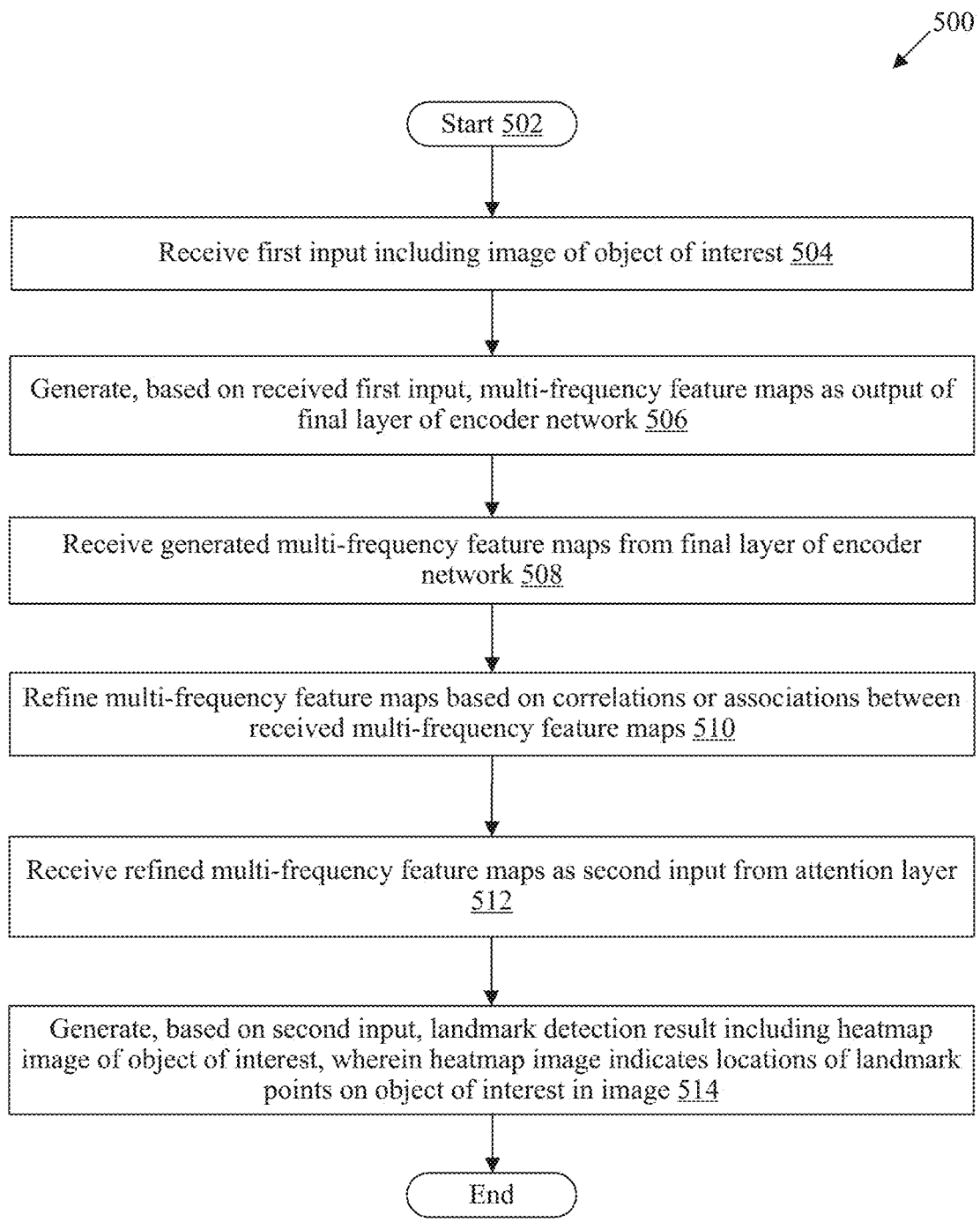
FIG. 5 is a flowchart that illustrates an exemplary method of landmark detection using deep neural network with multi-frequency self-attention, in accordance with an embodiment of the disclosure.

FIG. 5 is a flowchart that illustrates an exemplary method of landmark detection using deep neural network with multi-frequency self-attention, in accordance with an embodiment of the disclosure. FIG. 5 is explained in conjunction with elements from FIG. 1, FIG. 2, FIG. 3A, FIG. 3B, FIG. 3C, FIG. 4A, and FIG. 4B. With reference to FIG. 5, there is shown a flowchart 500. The operations of the flowchart 500 may start at 502 and may proceed to 504.

At 504, the first input may be received as an input. The first input may include the image 124 of the object of interest 126. In at least one embodiment, the encoder network 108 may be configured to receive the first input that may include the image 124 of the object of interest 126.

At 506, the multi-frequency feature maps may be generated as the output of the final layer 120N of the encoder network 108. The output may be generated based on the received first input. In at least one embodiment, the encoder network 108 may be configured to generate the multi-frequency feature maps as the output of the final layer 120N of the encoder network 108 based on the received first input.

At 508, the generated multi-frequency feature maps may be received from the final layer 120N of the encoder network 108. In at least one embodiment, the attention layer 110 may be configured to receive the generated multi-frequency feature maps from the final layer 120N of the encoder network 108.

At 510, the multi-frequency feature maps may be refined. The multi-frequency feature maps may be refined based on the correlations or associations between the received multifrequency feature maps. In at least one embodiment, the attention layer 110 may be configured to refine the multi-frequency feature maps based on the correlations or associations between the received multi-frequency feature maps.

At 512, the refined multi-frequency feature maps may be received as the second input from the attention layer 110. In at least one embodiment, the decoder network 112 may be configured to receive the refined multi-frequency feature maps as the second input from the attention layer 110.

At 514, the landmark detection result may be generated based on the second input. The landmark detection result may include the heatmap image 128 of the object of interest 126. The heatmap image 128 may indicate locations of the landmark points 130 on the object of interest 126 in the image 124. In at least one embodiment, the decoder network 112 may be configured to generate the landmark detection result that includes the heatmap image 128 of the object of interest 126 based on the second input, wherein the heatmap image 128 indicates the locations of the landmark points 130 on the object of interest 126 in the image 124. Control may pass to end.

Various embodiments of the disclosure may provide a non-transitory computer-readable medium and/or storage medium having stored thereon, instructions executable by a machine and/or a computer to operate a system (e.g., the system 102) for landmark detection using deep neural network with multi-frequency self-attention. The instructions may cause the machine and/or computer to perform operations that include receiving a first input that may include an image (e.g., the image 124) of an object of interest (e.g., the object of interest 126) as an input. The operations further include generating multi-frequency feature maps as an output of a final layer (e.g., the final layer 120N) of an encoder network (e.g., the encoder network 108). The operations further include receiving the generated multi-frequency feature maps from the final layer 120N of the encoder network 304. The operations further include refining the multi-frequency feature maps based on correlations or associations between the received multi-frequency feature maps. The operations further include receiving the refined multi-frequency feature maps as a second input from an attention layer (e.g., the attention layer 110). The operations further include generating a landmark detection result that may include a heatmap image (e.g., the heatmap image 128) of the object of interest. The heatmap image may indicate locations of landmark points (e.g., the landmark points 130) on the object of interest in the image.

Certain embodiments of the disclosure may be found in a system and a method for landmark detection using deep neural network with multi-frequency self-attention. Various embodiments of the disclosure may provide the system 102 that may include the encoder network 108 that may be configured to receive the first input including the image 124 of the object of interest 126. The object of interest 126 may correspond to a face portion of a real-life person, a person's caricature, a fictious character, or a cartoon character. The encoder network 108 may be further configured to generate multi-frequency feature maps as an output of the final layer 120N of the encoder network 108 based on the received first input. The multi-frequency feature maps may include a first frequency feature map that captures first spatial information associated with global shape-features of the object of interest 126 and a second frequency feature map that captures second spatial information associated with local shape features which are finer and greater in number in comparison to the global shape-features on the object of interest 126.

In accordance with an embodiment, the encoder network 108 includes a plurality of encoding layers 120. The plurality of encoding layers 120 may further include the input layer 120A and the first set of convolution layers 120B that follow the input layer 120A. A first convolution layer of the first set of convolution layers 120B may be coupled to the input layer 120A of the encoder network 108 and each remaining convolution layer of the first set of convolution layers 120B is coupled to a previous convolution layer of the plurality of encoding layers 120. Each convolution layer of the first set of convolution layers 120B includes two convolution operators. Each of the two convolution operators corresponds to an octave convolution operation.

In accordance with an embodiment, the encoder network 108 may be configured to divide the image 124 included in the received first input into initial multi-frequency feature maps. The encoder network 108 may be further configured to pass the initial multi-frequency feature maps through the first set of convolution layers 120B to generate the multi-frequency feature maps as the output of the final layer 120N of the encoder network 108. Each convolution layer between the input layer 120A of the encoder network 108 and the final layer 120N of the encoder network 108 generates a first set of intermediate multi-frequency feature maps. A size of each intermediate feature map of the first set of intermediate multi-frequency feature maps is less than the initial multi-frequency feature maps and more than the multi-frequency feature maps.

The system 102 may further include the attention layer 110 that may be configured to receive the generated multi-frequency feature maps from the final layer 120N of the encoder network 108. The attention layer 110 may be further configured to refine the multi-frequency feature maps based on correlations or associations between the received multi-frequency feature maps.

In accordance with an embodiment, the system 102 may further include the decoder network 112 that may be configured to receive the refined multi-frequency feature maps as a second input from the attention layer 110. The decoder network 112 may be coupled to the encoder network 108 via the attention layer 110. The decoder network 112 may include the plurality of decoding layers 122. The plurality of decoding layers 122 may include the input layer 122A and the second set of convolution layers 122B that follow the input layer 122A of the decoder network 112. The first convolution layer of the second set of convolution layers 122B may be coupled to the input layer 122A of the decoder network 112 and each remaining convolution layer of the second set of convolution layers 122B may be coupled to the previous convolution layer of the plurality of decoding layers 122. Each convolution layer of the second set of convolution layers 122B includes two convolution operators. Each of the two convolution operators corresponds to a transposed octave convolution operation.

In accordance with an embodiment, the decoder network 112 may be configured to pass the refined multi-frequency feature maps through the second set of convolution layers 122B to generate the landmark detection result as an output of the final layer 122N of the decoder network 112. Each convolution layer between the input layer 122A of the decoder network 112 and the final layer 122N of the decoder network 112 generates the second set of intermediate multi-frequency feature maps. The size of each intermediate feature map of the second set of intermediate multi-frequency feature maps is more than the refined multi-frequency feature maps.

In accordance with an embodiment, the landmark detection result may include the heatmap image 128 of the object of interest 126. The heatmap image 128 may indicate locations of landmark points 130 on the object of interest 126 in the image 124.

In accordance with an embodiment, the system 102 may further include a skip connection between the intermediate encoding layer of the encoder network 108 and the intermediate decoding layer of the decoder network 112. The intermediate encoding layer of the encoder network 108 may be configured to generate the first set of intermediate multi-frequency feature maps based on inputs from a previous layer of the encoder network 108. The skip connection may be configured to transfer spatial information included in the first set of intermediate multi-frequency feature maps to the intermediate decoding layer of the decoder network 112.

In accordance with an embodiment, the system 102 may further include the processor 104 that may be configured to extract the landmark detection result from the final layer 122N of the decoder network 112. The processor 104 may be further configured to overlay colored markings on the image 124 to indicate the locations of the landmark points on the objected of interest 126. The processor 104 may be further configured to control the display device 116 to render an output that includes the colored markings overlaid on the image 124.

In accordance with an embodiment, the encoder network 108 and the decoder network 112 may be deep neural networks (DNNs). The encoder network 108, the decoder network 112, and the attention layer 110 may together form the encoder-decoder neural network 106 that may be trained on the task of landmark detection.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. A system, comprising:
an encoder network configured to:
   receive a first input comprising an image of an object of interest; and
   generate, based on the received first input, multi-frequency feature maps as an output of a final layer of the encoder network;
an attention layer coupled to the final layer of the encoder network, wherein the attention layer is configured to:
   receive the multi-frequency feature maps from the final layer of the encoder network;
   obtain a plurality of embeddings from the multi-frequency feature maps;
   change a size of each embedding of the plurality of embeddings to a particular size;
   calculate, based on each embedding of the plurality of embeddings having the particular size, a similarity matrix that captures dependencies between the multi-frequency feature maps; and
   refine the multi-frequency feature maps based on the calculated similarity matrix; and
a decoder network coupled to the encoder network via the attention layer, wherein the decoder network is configured to:
   receive the refined multi-frequency feature maps as a second input from the attention layer; and
   generate, based on the second input, a landmark detection result comprising a heatmap image of the object of interest,
      wherein the heatmap image indicates locations of landmark points on the object of interest in the image.

2. The system according to claim 1, wherein the object of interest corresponds to one of a face portion of a real-life person, a person's caricature, a fictious character, or a cartoon character.

3. The system according to claim 1, wherein
the encoder network and the decoder network are deep neural networks (DNNs), and
the encoder network, the decoder network, and the attention layer together form an encoder-decoder neural network that is trained on a task of landmark detection.

4. The system according to claim 1, wherein the multi-frequency feature maps comprise:
a first frequency feature map that captures first spatial information associated with global shape-features of the object of interest, and
a second frequency feature map that captures second spatial information associated with local shape features which are finer and greater in number in comparison to the global shape-features on the object of interest.

5. The system according to claim 1, wherein
the encoder network comprises a plurality of encoding layers,
the plurality of encoding layers comprises an input layer and a first set of convolution layers that follow the input layer of the encoder network, and
a first convolution layer of the first set of convolution layers is coupled to the input layer of the encoder network and each remaining convolution layer of the first set of convolution layers is coupled to a previous convolution layer of the first set of convolution layers.

6. The system according to claim 5, wherein
each convolution layer of the first set of convolution layers includes two convolution operators, and
each convolution operator of the two convolution operators corresponds to an octave convolution operation.

7. The system according to claim 5, wherein
the encoder network is further configured to:
divide the image included in the received first input into initial multi-frequency feature maps; and
pass the initial multi-frequency feature maps through the first set of convolution layers to generate the multi-frequency feature maps as the output of the final layer of the encoder network,
each convolution layer of the first set of convolution layers between the input layer of the encoder network and the final layer of the encoder network generates a first set of intermediate multi-frequency feature maps, and
a size of each intermediate feature map of the first set of intermediate multi-frequency feature maps is less than a size of each initial multi-frequency feature map of the initial multi-frequency feature maps and more than a size of each multi-frequency feature map of the multi-frequency feature maps.

8. The system according to claim 1, wherein
the decoder network comprises a plurality of decoding layers,
the plurality of decoding layers comprises an input layer and a second set of convolution layers that follow the input layer of the decoder network, and
a first convolution layer of the second set of convolution layers is coupled to the input layer of the decoder network and each remaining convolution layer of the second set of convolution layers is coupled to a previous convolution layer of the second set of convolution layers.

9. The system according to claim 8, wherein
each convolution layer of the second set of convolution layers includes two convolution operators, and
each of the two convolution operators corresponds to a transposed octave convolution operation.

10. The system according to claim 8, wherein
the decoder network is further configured to pass the refined multi-frequency feature maps through the second set of convolution layers to generate the landmark detection result as an output of a final layer of the decoder network,
each convolution layer of the second set of convolution layers between the input layer of the decoder network and the final layer of the decoder network generates a second set of intermediate multi-frequency feature maps, and
a size of each intermediate feature map of the second set of intermediate multi-frequency feature maps is more than a size of each refined multi-frequency feature map of the refined multi-frequency feature maps.

11. The system according to claim 1, further comprising a skip connection between an intermediate encoding layer of the encoder network and an intermediate decoding layer of the decoder network.

12. The system according to claim 11, wherein
the intermediate encoding layer of the encoder network is configured to generate a first set of intermediate multi-frequency feature maps based on inputs from a previous layer of the encoder network, and
the skip connection is configured to transfer spatial information included in the first set of intermediate multi-frequency feature maps to the intermediate decoding layer of the decoder network.

13. The system according to claim 1, further comprising a processor configured to:
extract the landmark detection result from a final layer of the decoder network;
overlay colored markings on the image to indicate the locations of the landmark points on the object of interest; and
control a display device to render an output that includes the colored markings overlaid on the image.

14. A method, comprising:
receiving, by an encoder network, a first input comprising an image of an object of interest;
generating, by the encoder network, multi-frequency feature maps as an output of a final layer of the encoder network based on the received first input;
receiving, by an attention layer coupled to the final layer of the encoder network, the multi-frequency feature maps from the final layer of the encoder network;
obtaining, by the attention layer, a plurality of embeddings from the multi-frequency feature maps;
changing, by the attention layer, a size of each embedding of the plurality of embeddings to a particular size;
calculating, by the attention layer, based on each embedding of the plurality of embeddings having the particular size, a similarity matrix that captures dependencies between the multi-frequency feature maps;
refining, by the attention layer, the multi-frequency feature maps based on the calculated similarity matrix;
receiving, by a decoder network coupled to the encoder network via the attention layer, the refined multi-frequency feature maps as a second input from the attention layer; and
generating, by the decoder network, a landmark detection result comprising a heatmap image of the object of interest based on the second input,
wherein the heatmap image indicates locations of landmark points on the object of interest in the image.

15. The method according to claim 14, wherein the object of interest corresponds to one of a face portion of a real-life person, a person's caricature, a fictious character, or a cartoon character.

16. The method according to claim 14, wherein
the encoder network and the decoder network are deep neural networks (DNNs), and
the encoder network, the decoder network, and the attention layer together form an encoder-decoder neural network that is trained on a task of landmark detection.

17. The method according to claim 14, wherein
the encoder network comprises a plurality of encoding layers,
the plurality of encoding layers comprises an input layer and a first set of convolution layers that follow the input layer of the encoder network, and
a first convolution layer of the first set of convolution layers is coupled to the input layer of the encoder network and each remaining convolution layer of the first set of convolution layers is coupled to a previous convolution layer of the first set of convolution layers.

18. The method according to claim 17, wherein
each convolution layer of the first set of convolution layers includes two convolution operators, and
each convolution operator of the two convolution operators corresponds to an octave convolution operation.

19. The method according to claim 17, further comprising:
- dividing, by the encoder network, the image included in the received first input into initial multi-frequency feature maps; and
- passing, by the encoder network, the initial multi-frequency feature maps through the first set of convolution layers to generate the multi-frequency feature maps as the output of the final layer of the encoder network, wherein
  - each convolution layer of the first set of convolution layers between the input layer of the encoder network and the final layer of the encoder network generates a first set of intermediate multi-frequency feature maps, and
  - a size of each intermediate feature map of the first set of intermediate multi-frequency feature maps is less than a size of each initial multi-frequency feature map of the initial multi-frequency feature maps and more than a size of each multi-frequency feature map of the multi-frequency feature maps.

20. The method according to claim 14, wherein the decoder network comprises a plurality of decoding layers,
- the plurality of decoding layers comprises an input layer and a second set of convolution layers that follow the input layer of the decoder network, and
- a first convolution layer of the second set of convolution layers is coupled to the input layer of the decoder network and each remaining convolution layer of the second set of convolution layers is coupled to a previous convolution layer of the second set of convolution layers.

* * * * *